(12) United States Patent
Fan

(10) Patent No.: US 7,053,965 B1
(45) Date of Patent: *May 30, 2006

(54) REMOTE CONTROL FOR CONTROLLING A COMPUTER USING A SCREEN OF A TELEVISION

(76) Inventor: Nong-Qiang Fan, P.O. Box 280763, San Francisco, CA (US) 94128-0763

( * ) Notice: Subject to any disclaimer, the term of this patent is extended or adjusted under 35 U.S.C. 154(b) by 573 days.

This patent is subject to a terminal disclaimer.

(21) Appl. No.: 10/460,733

(22) Filed: Jun. 10, 2003

(51) Int. Cl.
*H04N 5/44* (2006.01)

(52) U.S. Cl. .................................... 348/734

(58) Field of Classification Search ............... 348/734, 348/725, 723, 552, 553; 345/157–158; 340/825.69, 340/825.72, 825.22
See application file for complete search history.

(56) References Cited

U.S. PATENT DOCUMENTS

| | | | |
|---|---|---|---|
| 4,591,841 A | * | 5/1986 | Gunderson et al. ......... 345/180 |
| 4,959,721 A | * | 9/1990 | Micic et al. ................ 348/734 |
| 5,554,980 A | * | 9/1996 | Hashimoto et al. ..... 340/825.72 |
| 5,636,211 A | * | 6/1997 | Newlin et al. .............. 370/465 |
| 5,767,919 A | * | 6/1998 | Lee et al. ...................... 725/37 |
| 5,793,361 A | * | 8/1998 | Kahn et al. ................. 345/179 |
| 5,903,322 A | * | 5/1999 | Chen .......................... 348/723 |
| 6,097,441 A | * | 8/2000 | Allport ....................... 348/552 |
| 6,535,198 B1 | * | 3/2003 | Fan ............................ 345/158 |
| 6,975,301 B1 | * | 12/2005 | Fan ............................ 345/158 |

* cited by examiner

*Primary Examiner*—Paulos M. Natnael

(57) ABSTRACT

A remote control for controlling a computer using a screen of a television is disclosed. The television receives a video signal from the computer, and a remote control receiver is connecting to the computer. The remote control includes a body member, a light-scope, a photo detector, an electromagnetic emitter, and a mouse button. The light-scope includes a lens system defining a narrow field of view and receives a light signal emitted from an aiming point on the screen of the television as pointed by the light-scope. The photo detector detects the light signal received by the light-scope. The electromagnetic emitter sends back to the remote control receiver a communicating electromagnetic signal communicating the timing that a light signal is emitted from the aiming point. The computer can display a cursor at the aiming point.

39 Claims, 4 Drawing Sheets

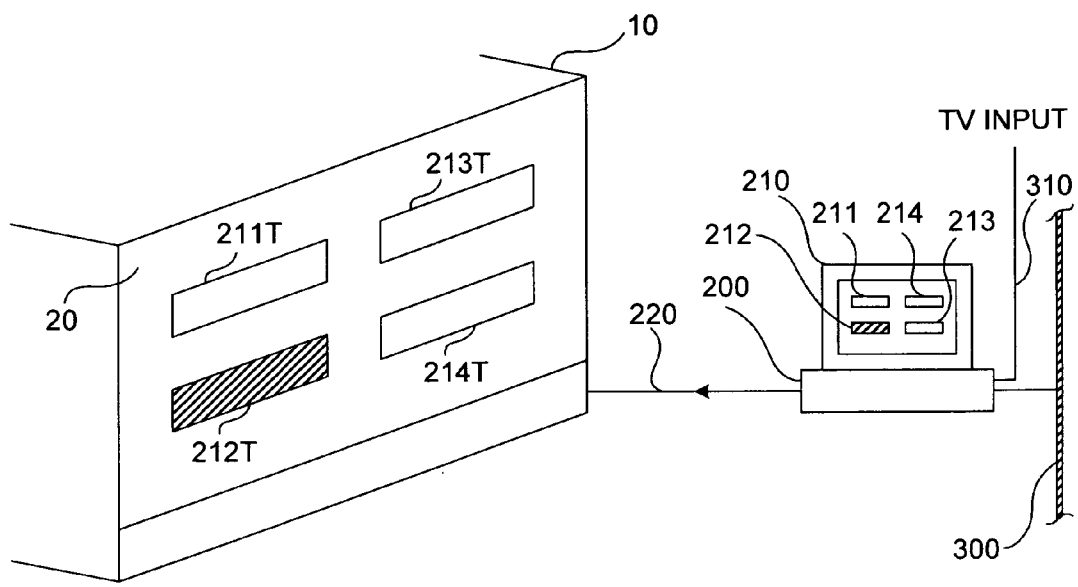
PRIOR ART
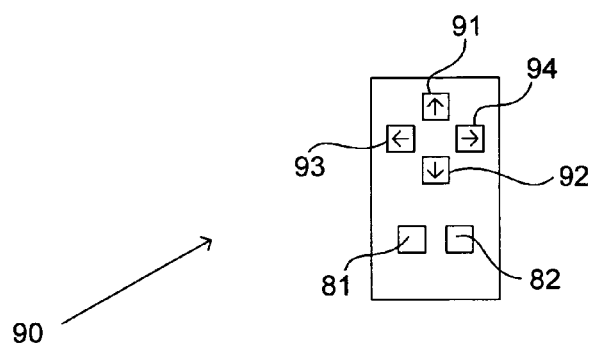
FIG._1

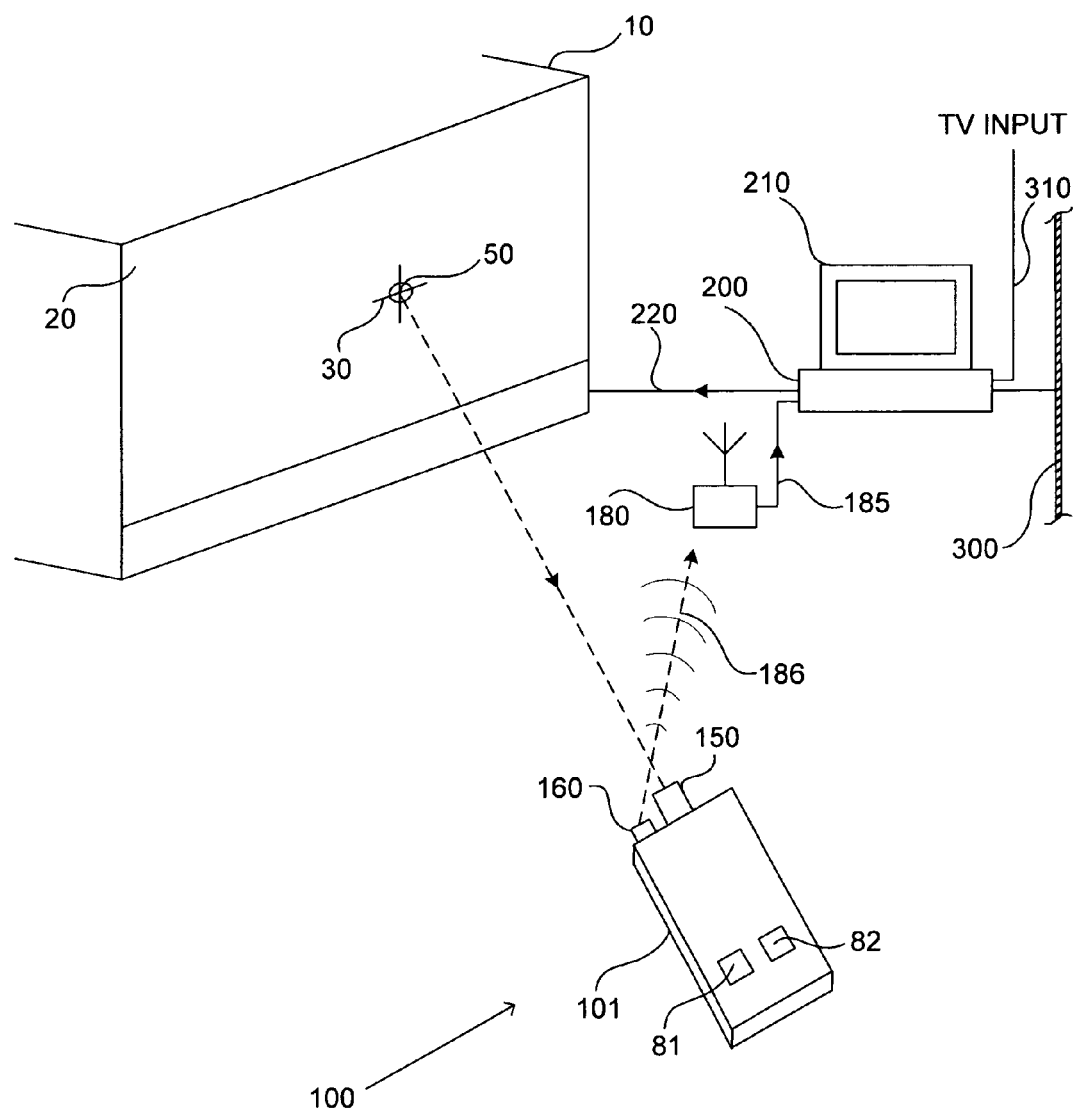
FIG._2

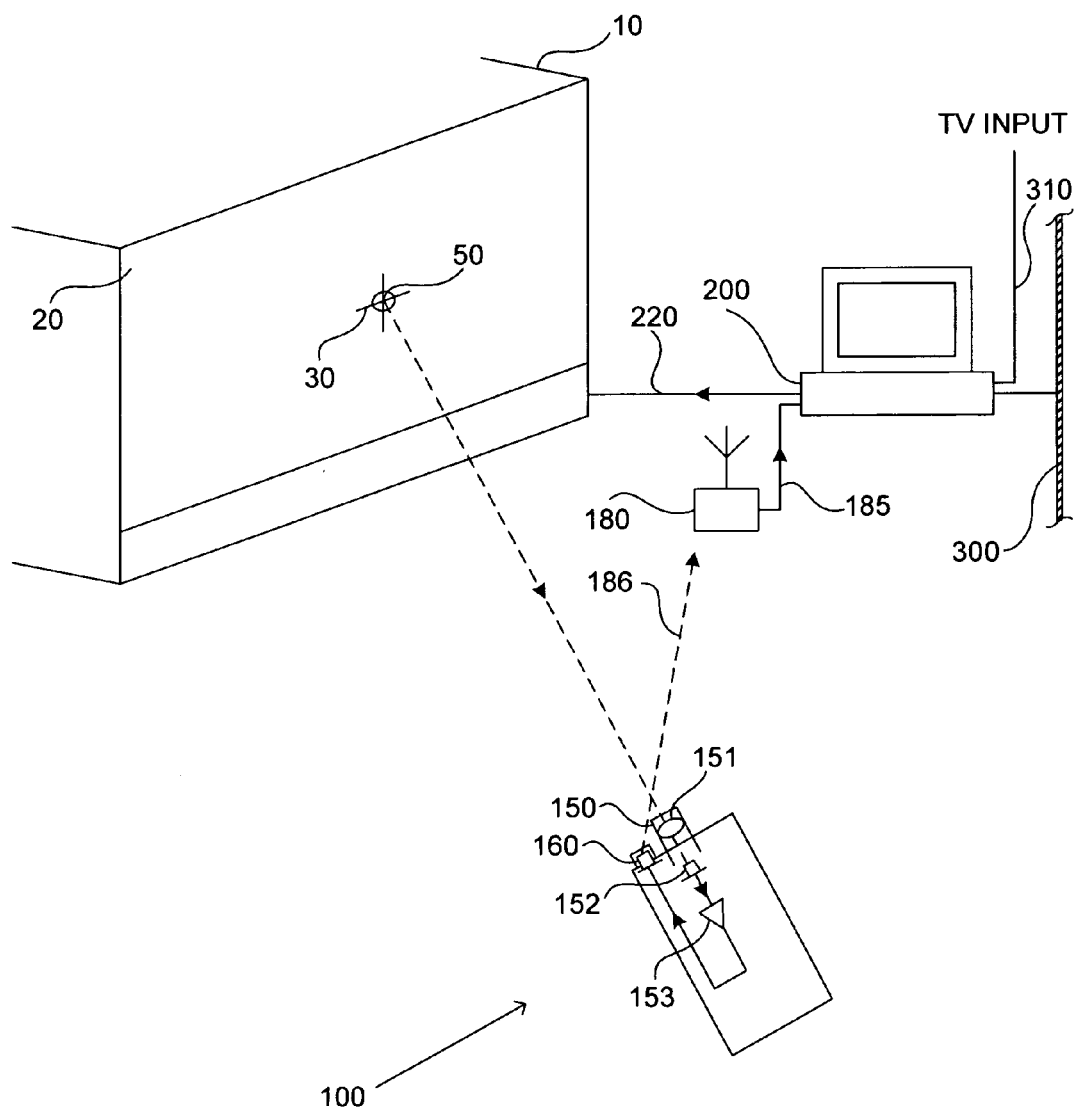
FIG._3

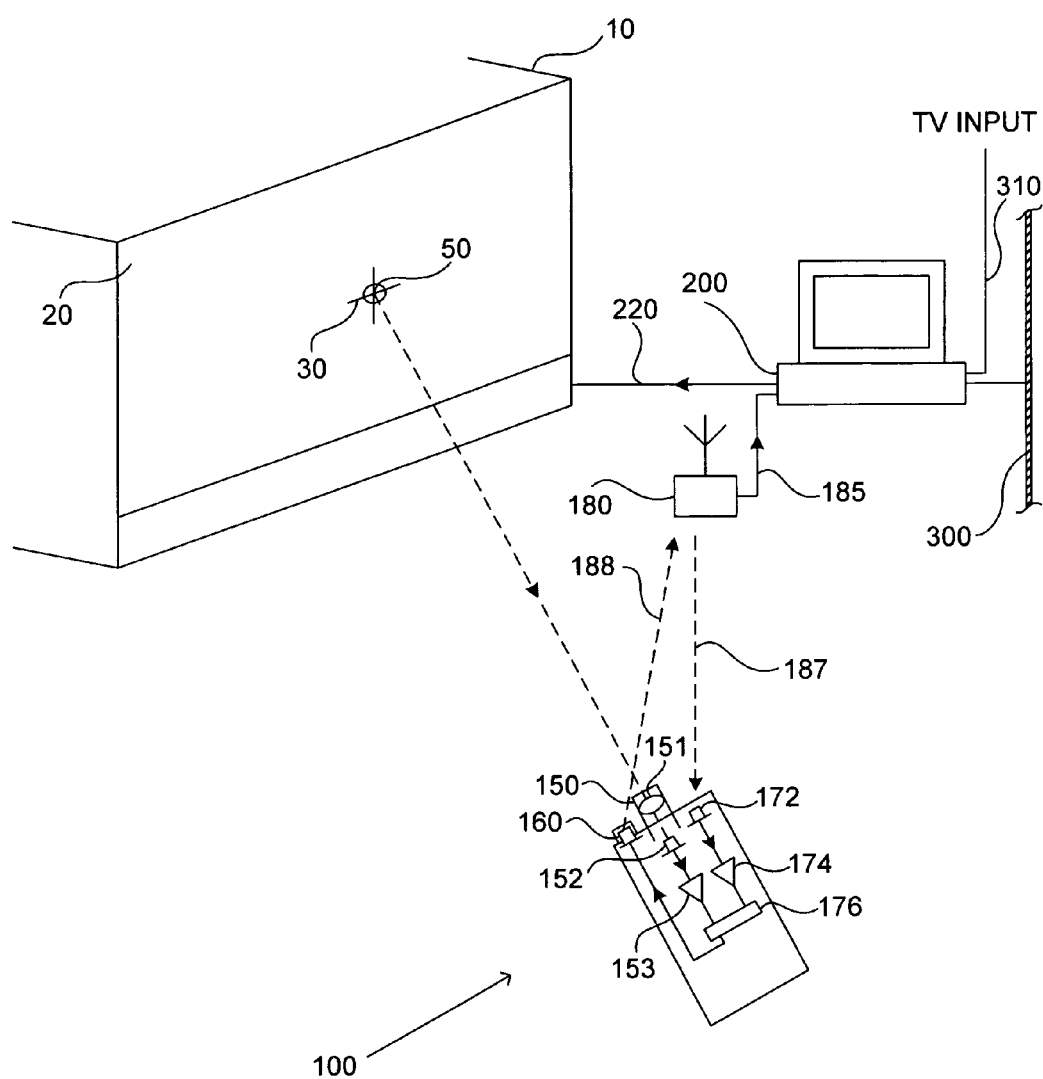
FIG._4

REMOTE CONTROL FOR CONTROLLING A COMPUTER USING A SCREEN OF A TELEVISION

BACKGROUND

The present invention relates generally to a remote control, and more particularly to a remote control for controlling a computer using a screen of a television.

FIG. 1 shows that a video signal is sent from a computer 200 to a television 10. An audio signal can also be sent from computer 200 to television 10 at the same time. The video signal or the audio signal of computer 200 can be sent to television 10 through a cable 220. The video signal or the audio signal of computer 200 can also be sent to television 10 wirelessly. Television 10 generally has a screen 20 that is larger than a computer monitor 210 of computer 200.

Computer 200 can be connected to a home network 300. Home network 300 can be a wired network such as a Ethernet network, or a wireless network such as a Wi-Fi network. Home network 300 can be a combination of one or more wired networks and wireless networks. Stereos, CD players, DVD players, televisions, and other home entertainment devices can be connected to home network 300. Temperature controllers, home lightning controllers, refrigerator controllers, security cameras, speakerphones, and other home electronics can also be connected to home network 300. Home network 300 can also be connected to the Internet.

A television signal can be sent to computer 200. The television signal can be sent to computer 200 through a television cable 310. The television signal can also be sent to computer 200 through home network 300. Other video signals from home network 300 or from the Internet can also be sent to computer 200. Computer 200 can be configured as a Personal Video Recorder for recording and playing TV programs. Computer 200 can be used to play DVDs, CDs, MP3 files, or WMA files. As a specific example, computer 200 can be a Media Center PC based on Microsoft's Windows operating system. Other operating systems such as Linux can also be used on computer 200. Computer 200 can be a desktop computer, a notebook computer, or a special purpose computer for TV.

Computer 200 generally can be controlled by a remote control 90 from a distance. Remote control 90 generally includes one or more mouse buttons 81 and 82. Remote control 90 generally also includes cursor keys 91, 92, 93, and 94, for moving a cursor, respectively, to the up-direction, down-direction, left-direction, and right-direction. When arrays of menu items (e.g., 211, 212, 213, and 214) are displayed on computer monitor 210, cursor keys (i.e., 91, 92, 93, and 94) can be used to select the menu item to be activated when a mouse button (e.g., 81 or 82) is pressed.

When the video output of computer 200 is sent to television 10, menu items 211, 212, 213, and 214 are generally displayed, respectively, as menu items 211T, 212T, 213T, and 214T on screen 20 of television 10. A properly configured remote control 90 can also be used to select the menu items (e.g., 211T, 212T, 213T, and 214T) to be activated when a mouse button (e.g., 81 or 82) is pressed.

When a cursor is displayed on screen 20 of television 10, a properly configured remote control 90 can move the cursor in different directions. It is desirable, however, to move the cursor more easily and intuitively with an improved remote control.

SUMMARY

In one aspect, the invention is directed to a remote control for controlling a computer using a screen of a television. The television receives a video signal from the computer, and a remote control receiver is connecting to the computer. The remote control includes a body member, a light-scope, a photo detector, an electromagnetic emitter, and a mouse button. The light-scope includes a lens system having at least one lens and defines a narrow field of view. The light-scope is fixed on the body member and receives a light signal emitted from an aiming point on the screen of the television as pointed by the light-scope. The photo detector detects a light signal received by the light-scope. The electromagnetic emitter sends back to the remote control receiver a communicating electromagnetic signal communicating the timing that a light signal is emitted from the aiming point on the screen of the television as pointed by the light-scope. The computer can display a cursor at the aiming point. The mouse button is fixed on the body member for controlling the computer. An action of the mouse button is wirelessly sent to the computer.

Implementations of the invention may include one or more of the following features. The photo detector can be a photo diode, a phototransistor, or a photo Darlington. The action of the mouse button can be wirelessly sent to the computer through the remote control receiver. The video signal can be sent from the computer to the television wirelessly. The light-scope can be a convex lens. The electromagnetic emitter can be driven by an electric signal that is converted from a light signal detected by the photo detector. The electromagnetic emitter can be an RF emitter. The communicating electromagnetic signal can be an RF burst. The RF burst can be emitted essentially at the same time that the light signal is emitted from the aiming point. The RF burst can be emitted with a predetermined delay relative to the time that the light signal is emitted from the aiming point. The remote control can include an electromagnetic receiver operable to receive a synchronization pulse. The communicating electromagnetic signal can be a coded communicating signal that is related to the time difference between the timing that the light from the aiming point is emitted and the timing that the synchronization pulse is received.

In another aspect, the invention is directed to a method of controlling a computer using a remote control on a screen of a television. The method includes sending a video signal from the computer to the television. The method includes connecting a remote control receiver to the computer. The method includes sending an action of a mouse button on the remote control wirelessly to the computer. The method includes fixing a light-scope on a body member on the remote control. The light-scope includes a lens system having at least one lens and defining a narrow field of view. The method includes pointing the light-scope at an aiming point on the screen of the television such that the light-scope receives a light signal emitted from the aiming point. The method includes detecting a light signal received by the light-scope with a photo detector. The method includes sending back to the remote control receiver a communicating electromagnetic signal communicating the timing that the light signal is emitted from the aiming point on the screen of the television as pointed by the light-scope. The computer can display a cursor at the aiming point.

Implementations of the invention may include one or more of the following features. The photo detector can be a photo diode, a phototransistor, or a photo Darlington. The method can include sending the action of the mouse button on the remote control wirelessly to the computer through the remote control receiver. The method can include sending the video signal from the computer to the television wirelessly. The light-scope can be a convex lens. The method can include driving an electromagnetic emitter with an electric signal that is converted from a light signal detected by the photo detector. The electromagnetic emitter can be an RF emitter. The communicating electromagnetic signal can be an RF burst. The RF burst can be emitted essentially at the same time that the light signal is emitted from the aiming point. The RF burst can be emitted with a predetermined delay relative to the time that the light signal is emitted from the aiming point. The communicating electromagnetic signal can be a coded communicating signal. The method can include receiving a synchronization pulse and determining the time difference between the timing that the light from the aiming point is emitted and the timing that the synchronization pulse is received. The method can include connecting the remote control receiver to the computer through a USB port or a parallel port. The method can include connecting the remote control receiver to the computer through an internal bus.

In another aspect, the invention is directed to a remote control system for controlling a computer using a screen of a television. The television receives a video signal from the computer. The remote control system includes a remote control receiver and a remote control. The remote control receiver can be connected to the computer. The remote control includes a body member, a light-scope, a photo detector, an electromagnetic emitter, and a mouse button. The light-scope includes a lens system having at least one lens and defines a narrow field of view. The light-scope is fixed on the body member and receives a light signal emitted from an aiming point on the screen of the television as pointed by the light-scope. The photo detector detects a light signal received by the light-scope. The electromagnetic emitter sends back to the remote control receiver a communicating electromagnetic signal communicating the timing that a light signal is emitted from the aiming point on the screen of the television as pointed by the light-scope. The computer can display a cursor at the aiming point. The mouse button is fixed on the body member for controlling the computer. An action of the mouse button is wirelessly sent to the computer.

Implementations of the invention may include one or more of the following features. The remote control receiver can be connected to the computer through a USB port or a parallel port. The remote control receiver can be connected to the computer through an internal bus.

In another aspect, the invention is directed to a remote control for controlling a computer using a screen of a television. The television receives a video signal from the computer, and a remote control receiver is connecting to the computer. The remote control includes a body member, a light-scope, a photo detector, and a mouse button. The light-scope includes a lens system having at least one lens and defines a narrow field of view. The light-scope is fixed on the body member and receives a light signal emitted from an aiming point on the screen of the television as pointed by the light-scope. The photo detector detects a light signal received by the light-scope. The mouse button is fixed on the body member for controlling the computer. An action of the mouse button is wirelessly sent to the computer. The remote control also includes means for sending back to the remote control receiver a communicating electromagnetic signal communicating the timing that a light signal is emitted from the aiming point on the screen of the television as pointed by the light-scope. The computer can display a cursor at the aiming point.

Implementations of the invention may include one or more of the following features. The communicating signal can be a coded communicating signal, a communicating electromagnetic signal, or a communicating IR signal. The remote control can include means for receiving a synchronization pulse. The coded communicating signal can be related to the time difference between the timing that the light from the aiming point is emitted and the timing that the synchronization pulse is received. The remote control can include an IR emitter driven by an electric signal that is converted from a light signal detected by the photo detector. The IR emitter can send back to the remote control receiver the communicating IR signal communicating the timing that the light signal is emitted from the aiming point on the screen of the television as pointed by the light-scope. The communicating IR signal can be an IR pulse. The IR pulse can be emitted essentially at the same time that the light signal is emitted from the aiming point. The IR pulse can be emitted with a predetermined delay relative to the time that the light signal is emitted from the aiming point.

In another aspect, the invention is directed to a method of controlling a computer using a remote control on a screen of a television. The method includes sending a video signal from the computer to the television. The method includes connecting a remote control receiver to the computer. The method includes sending an action of a mouse button on the remote control wirelessly to the computer. The method includes fixing a light-scope on a body member on the remote control. The light-scope includes a lens system having at least one lens and defining a narrow field of view. The method includes pointing the light-scope at an aiming point on the screen of the television such that the light-scope receives a light signal emitted from the aiming point. The method includes detecting a light signal received by the light-scope with a photo detector. The method includes sending back to the remote control receiver a communicating IR signal communicating the timing that the light signal is emitted from the aiming point on the screen of the television as pointed by the light-scope. The computer can display a cursor at the aiming point.

Implementations of the invention may include one or more of the following features. The method can include driving an IR emitter with an electric signal that is converted from the light signal detected by the photo detector. The communicating IR signal can be an IR pulse. The IR pulse can be emitted essentially at the same time that the light signal is emitted from the aiming point. The IR pulse can be emitted with a predetermined delay relative to the time that the light signal is emitted from the aiming point. The communicating IR signal can be a coded communicating signal.

Implementations of the invention may include one or more of the following advantages. The remote control as described can be used to control a computer, a home network, home electronics, or home entertainment devices using a screen of a television. The remote control, as a versatile device, can be used in variety of combinations of different computers, different televisions, different designs of computer user interfaces, and different home network configurations. A remote control system that includes a remote control and a remote control receiver can be used as a standalone system and used as an independent building block for building home entertainment systems or home networks.

Additional advantages of the invention will be set forth in the description which follows, and in part will be obvious from the description, or may be learned by practice of the invention. The advantages of the invention may be realized by means of the instrumentalities and combinations particularly pointed out in the claims.

BRIEF DESCRIPTION OF THE DRAWINGS

The present invention will be understood more fully from the detailed description and accompanying drawings of the invention set forth herein. However, the drawings are not to be construed as limiting the invention to the specific embodiments shown and described herein. Like reference numbers are designated in the various drawings to indicate like elements.

FIG. 1 shows that a video signal is sent from a computer to a television.

FIG. 2 shows a remote control that controls a computer using a screen of a television such that a cursor generally is displayed at a position on the screen as pointed by the remote control.

FIG. 3 shows that an electromagnetic emitter is driven by an electric signal converted from the light signal detected by a photo detector and generates a communicating electromagnetic signal.

FIG. 4 shows that a synchronization pulse is sent from a remote control receiver to a remote control and a coded communicating signal is sent from the remote control to the remote control receiver.

DETAILED DESCRIPTION

FIG. 2 shows a remote control 100 for controlling a computer 200 using a screen 20 of a television 10 such that a cursor 30 generally is displayed at a position on screen 20 as pointed by remote control 100.

Remote control 100 includes a body member 101, one or more mouse buttons 81 and 82, a light-scope 150, and an electromagnetic emitter 160. Body member 101 can be substantially rectangular in shape or cylindrical in shape. An action on a mouse button (e.g., 81 or 82) is generally wirelessly sent to computer 200. Light-scope 150 is fixed on body member 101 and generally includes a lens system having at least one lens for defining a narrow field of view. In one implementation, the simplest form of light-scope 150 includes a convex lens. An aiming point 50 on screen 20 of television 10 as pointed by light-scope 150 defines a nominal position on screen 20 that a cursor 30 needs to be positioned. Only the light emitted from a small area near aiming point 50 are within the narrow field of view and can enter light-scope 150.

The position of aiming point 50 on screen 20 generally is determined by computer 200 using a communicating signal 186 that is sent from remote control 100 to computer 200. Communicating signal 186 generally communicates to computer 200 the timing that the light signal is emitted from aiming point 50.

In one implementation, communicating signal 186 is a communicating electromagnetic signal. The communicating electromagnetic signal generally is sent from electromagnetic emitter 160 on remote control 100 to a remote control receiver 180 connected to computer 200. An action on a mouse button (e.g., 81 or 82) can also be wirelessly sent to computer 200 through remote control receiver 180. Remote control receiver 180 can be connected to computer 200 through a USB port, a parallel port, or an internal bus such as a PCI bus.

The communicating electromagnetic signal can be in the form of an RF burst. In one implementation, the RF burst is emitted essentially at the same time that the light signal is emitted from aiming point 50. In another implementation, the RF burst is emitted with a predetermined delay relative to the time that the light signal is emitted from aiming point 50.

Screen 20 of television 10 is usually the screen of a CRT tube or the screen of a projection display. The imaging on television screen 20 is displayed by scanning the screen line by line with electron guns (as in the case of a CRT tube) or light guns (as in the case of a projection screen). Every full imaging is generally scanned in less than ⅟30 second. The timing when the light from aiming point 50 is emitted can be determined by computer 200 after a communicating electromagnetic signal (such as an RF burst) from remote control 100 to computer 200 is received. By comparing the timing when the light from aiming point 50 is emitted with the synchronization signal for scanning an imaging on screen 20, computer 200 can determine the position (or coordinates) of aiming point 50 and display cursor 30 at that position.

In a specific example, screen 20 of television 10 is the screen of a CRT tube, and an image on screen 20 is progressively scanned with N lines in a time period T. Assume that the start time of the scanning is t0, and the timing when the light from aiming point 50 is emitted is t1. It can be determine that the vertical position of aiming point 50 is at $y=\text{int}\{(t1-t0)N/T\}$, and the horizontal position of aiming point 50 is at $x=[(t1-t0)N/T-y]M$. In the above, $\text{int}\{(t1-t0)N/T\}$ is the integer part of $(t1-t0)N/T$, and M is the horizontal width of screen 20. In another example, when an image on screen 20 is scanned in an interlaced format, the position of aiming point 50 can still be determined from the timing that the light from aiming point 50 is emitted.

FIG. 3 shows that a communicating electromagnetic signal can be generated from electromagnetic emitter 160 that is driven by an electric signal converted from the light signal detected by a photo detector 152. In FIG. 3, the light signal from aiming point 50 is received by light-scope 150 and detected by photo detector 152. Light-scope 150 can include a convex lens 151. Photo detector 152 can be a photo diode, a phototransistor and a photo Darlington. The light signal detected by photo detector 152 is converted to an electric signal. The converted electric signal is used to drive electromagnetic emitter 160 for creating a communicating electromagnetic signal that is sent back to computer 200 through remote control receiver 180. In one implementation, the converted electric signal is amplified by an amplifier 153 before the converted electric signal is used to drive electromagnetic emitter 160.

In an alternative implementation, electromagnetic emitter 160 in FIG. 3 can be replaced with an IR emitter. A communicating IR signal generated from the IR emitter can be used as the communicating signal for communicating to computer 200 the timing that the light signal is emitted from aiming point 50. The communicating IR signal can be in the form of an IR pulse. The IR pulse can be emitted essentially at the same time that the light signal is emitted from aiming point 50. The IR pulse can also be emitted with a predetermined delay relative to the time that the light signal is emitted from aiming point 50.

In another alternative implementation, the timing that the light from aiming point 50 is emitted can be coded and sent from remote control 100 to computer 200 in a coded communicating signal. The coded communicating signal can be coded in the form of pulse series. The coded communicating signal can also be coded in other format.

FIG. 4 shows that a synchronization pulse 187 is sent from remote control receiver 180 to remote control 100 and a coded communicating signal 188 is sent from remote control 100 to the remote control receiver 180. Synchronization pulse 187 generally is related to the synchronization signal for scanning an imaging on screen 20. Synchronization pulse 187 is received by an electromagnetic receiver 172 on remote control 100, amplified by an amplifier 174, and sent to a timing comparator 176. A converted electric signal that is converted from the light signal detected by photo detector 152 is also sent to timing comparator 176.

Synchronization pulse 187 can be an RF burst emitted from remote control receiver 180 at the same time that starts the scanning of an imaging on screen 20. Synchronization pulse 187 can also be an RF burst emitted from remote control receiver 180 at a predetermined delay relative to the time that starts the scanning of an imaging on screen 20.

The timing comparator 176 generally determines the time difference between the timing that the light from aiming point 50 is emitted and the timing that synchronization pulse 187 is emitted. This time difference can be coded by timing comparator 176 and send to electromagnetic emitter 160. Electromagnetic emitter 160 generates coded communicating signal 188 that is sent from remote control 100 to remote control receiver 180. After receiving coded communicating signal 188 from remote control receiver 180, computer 200 can determine the timing that the light from aiming point 50 is emitted and calculate the position of aiming point 50.

In FIG. 4, synchronization pulse 187 can also be an IR pulse emitted from remote control receiver 180 and electromagnetic receiver 172 can correspondingly be changed to an IR detector. In FIG. 4, electromagnetic emitter 160 can also be an IR emitter. A coded communicating IR signal generated from the IR emitter can be used as coded communicating signal 188 for communicating to computer 200 the timing that the light signal is emitted from aiming point 50.

Remote control 100 has many applications. Remote control 100 can be used to control computer 200 using screen 20 of television 10. Remote control 100 can be used to control home network 300 by controlling computer 200 using the screen of the television. Remote control 100 can be used to control home entertainment devices connected the home network by controlling computer 200 using the screen of the television. Remote control 100 can be used to control home electronics connected to the home network by controlling computer 200 using the screen of the television. When computer 200 is connected to the Internet, web pages or TV program guides stored on a server on the Internet can be accessed from the screen of the television, and the access process can be controlled by remote control 100.

As a specific example, when computer 200 is configured as a Personal Video Recorder, the recoding process and playing process of the Personal Video Recorder can be controlled by remote control 100. When computer 200 is used as DVD and CD players, the playing of video and audio files can also be controlled by remote control 100. When computer 200 is connected to the Internet, video and audio files stored on a server on the Internet can be controlled by remote control 100 as well.

Other applications of remote control 100 are possible.

Remote control 100 has many advantages. For example, when remote control 100 in FIG. 2 is used to control a computer using the screen of a television, the television chosen for this purpose can have verity kinds of resolutions and scanning modes. Remote control 100 can be used in verity of combinations of different computers, different televisions, different designs of computer user interfaces, and different home network configurations. Thus, remote control 100 can be a versatile device. A remote control system that includes a remote control 100 and a remote control receiver 180 can be used as a standalone system and be used as an independent building block for building home entertainment systems or home networks.

The present invention has been described in terms of a number of implementations. The invention, however, is not limited to the implementations depicted and described. Rather, the scope of the invention is defined by the appended claims.

What is claimed is:

1. A remote control for controlling a computer using a screen of a television, the television receiving a video signal from the computer, a remote control receiver connecting to the computer, the remote control comprising:

a body member;

a light-scope including a lens system having at least one lens and defining a narrow field of view, the light-scope being fixed on the body member and receiving a light signal emitted from an aiming point on the screen of the television as pointed by the light-scope;

a photo detector for detecting a light signal received by the light-scope;

an electromagnetic emitter sending back to the remote control receiver a communicating electromagnetic signal communicating the timing that a light signal is emitted from the aiming point on the screen of the television as pointed by the light-scope, whereby the computer can display a cursor at the aiming point; and a mouse button fixed on the body member for controlling the computer, and wherein an action of the mouse button is wirelessly sent to the computer.

2. The remote control of claim 1 wherein the photo detector is selected from a group consisting of a photo diode, a phototransistor, and a photo Darlington.

3. The remote control of claim 1 wherein the action of the mouse button is wirelessly sent to the computer through the remote control receiver.

4. The remote control of claim 1 wherein the video signal is sent from the computer to the television wirelessly.

5. The remote control of claim 1 wherein the light-scope is a convex lens.

6. The remote control of claim 1 wherein the electromagnetic emitter is driven by an electric signal that is converted from a light signal detected by the photo detector.

7. The remote control of claim 1 wherein the electromagnetic emitter is an RF emitter.

8. The remote control of claim 7 wherein the communicating electromagnetic signal is an RF burst, and the RF burst is emitted essentially at the same time that the light signal is emitted from the aiming point.

9. The remote control of claim 7 wherein the communicating electromagnetic signal is an RF burst, and the RF burst is emitted with a predetermined delay relative to the time that the light signal is emitted from the aiming point.

10. The remote control of claim 1 further comprising an electromagnetic receiver operable to receive a synchronization pulse, and wherein the communicating electromagnetic signal is a coded communicating signal that is related to the time difference between the timing that the light from the aiming point is emitted and the timing that the synchronization pulse is received.

11. A method of controlling a computer using a remote control on a screen of a television, the method comprising:
sending a video signal from the computer to the television;
connecting a remote control receiver to the computer;
sending an action of a mouse button on the remote control wirelessly to the computer;
fixing a light-scope on a body member on the remote control, wherein the light-scope includes a lens system having at least one lens and defining a narrow field of view;
pointing the light-scope at an aiming point on the screen of the television such that the light-scope receives a light signal emitted from the aiming point;
detecting a light signal received by the light-scope with a photo detector; and
sending back to the remote control receiver a communicating electromagnetic signal communicating the timing that the light signal is emitted from the aiming point on the screen of the television as pointed by the light-scope, whereby the computer can display a cursor at the aiming point.

12. The method of claim 11 wherein the light signal received by the light-scope is detected with a photo detector selected from a group consisting of a photo diode, a phototransistor, and a photo Darlington.

13. The method of claim 11 wherein the step of sending an action of a mouse button includes sending the action of the mouse button on the remote control wirelessly to the computer through the remote control receiver.

14. The method of claim 11 wherein the step of sending a video signal includes sending the video signal from the computer to the television wirelessly.

15. The method of claim 11 wherein the light-scope is a convex lens.

16. The method of claim 11 wherein the step of sending back includes driving an electromagnetic emitter with an electric signal that is converted from a light signal detected by the photo detector.

17. The method of claim 11 wherein the electromagnetic emitter is an RF emitter.

18. The method of claim 11 wherein the communicating electromagnetic signal is an RF burst, and the RF burst is emitted essentially at the same time that the light signal is emitted from the aiming point.

19. The method of claim 11 wherein the communicating electromagnetic signal is an RF burst, and the RF burst is emitted with a predetermined delay relative to the time that the light signal is emitted from the aiming point.

20. The method of claim 11 wherein the communicating electromagnetic signal is a coded communicating signal.

21. The method of claim 11 further comprising receiving a synchronization pulse and determining the time difference between the timing that the light from the aiming point is emitted and the timing that the synchronization pulse is received.

22. The method of claim 11 wherein the step of connecting includes connecting the remote control receiver to the computer through a port selected from the group consisting of a USB port and a parallel port.

23. The method of claim 11 wherein the step of connecting includes connecting the remote control receiver to the computer through an internal bus.

24. A remote control system for controlling a computer using a screen of a television, the television receiving a video signal from the computer, the remote control system comprising:
a remote control receiver for connecting to the computer; and
a remote control including
a body member,
a light-scope including a lens system having at least one lens and defining a narrow field of view, the light-scope being fixed on the body member and receiving a light signal emitted from an aiming point on the screen of the television as pointed by the light-scope,
a photo detector for detecting a light signal received by the light-scope,
an electromagnetic emitter sending back to the remote control receiver a communicating electromagnetic signal communicating the timing that the light signal is emitted from the aiming point on the screen of the television as pointed by the light-scope, whereby the computer can display a cursor at the aiming point, and
a mouse button fixed on the body member for controlling the computer, and wherein an action of the mouse button is wirelessly sent to the computer.

25. The remote control system of claim 24 wherein the remote control receiver is connected to the computer through a port selected from the group consisting of a USB port and a parallel port.

26. The remote control system of claim 24 wherein the remote control receiver is connected to the computer through an internal bus.

27. A remote control for controlling a computer using a screen of a television, the television receiving a video signal from the computer, a remote control receiver connecting to the computer, the remote control comprising:
a body member;
a light-scope including a lens system having at least one lens and defining a narrow field of view, the light-scope being fixed on the body member and receiving a light signal emitted from an aiming point on the screen of the television as pointed by the light-scope;
a photo detector for detecting a light signal received by the light-scope;
means for sending back to the remote control receiver a communicating signal communicating the timing that the light signal is emitted from the aiming point on the screen of the television as pointed by the light-scope, whereby the computer can display a cursor at the aiming point; and
a mouse button fixed on the body member for controlling the computer, and wherein an action of the mouse button is wirelessly sent to the computer.

28. A remote control of claim 27 wherein the means for sending back includes means for sending back to the remote control receiver a coded communicating signal communicating the timing that the light signal is emitted from the aiming point on the screen of the television as pointed by the light-scope.

29. The remote control of claim 28 further comprising means for receiving a synchronization pulse, and wherein the coded communicating signal is related to the time difference between the timing that the light from the aiming point is emitted and the timing that the synchronization pulse is received.

30. A remote control of claim 27 wherein the means for sending back includes means for sending back to the remote control receiver a communicating electromagnetic signal communicating the timing that the light signal is emitted from the aiming point on the screen of the television as pointed by the light-scope.

31. A remote control of claim 27 wherein the means for sending back includes means for sending back to the remote control receiver a communicating IR signal communicating the timing that the light signal is emitted from the aiming point on the screen of the television as pointed by the light-scope.

32. A remote control of claim 31 further comprising an IR emitter driven by an electric signal that is converted from a light signal detected by the photo detector, the IR emitter sending back to the remote control receiver the communicating IR signal communicating the timing that the light signal is emitted from the aiming point on the screen of the television as pointed by the light-scope.

33. The remote control of claim 31 wherein the communicating IR signal is an IR pulse, and the IR pulse is emitted essentially at the same time that the light signal is emitted from the aiming point.

34. The remote control of claim 31 wherein the communicating IR signal is an IR pulse, and the IR pulse is emitted with a predetermined delay relative to the time that the light signal is emitted from the aiming point.

35. A method of controlling a computer using a remote control on a screen of a television, the method comprising:
    sending a video signal from the computer to the television;
    connecting a remote control receiver to the computer;
    sending an action of a mouse button on the remote control wirelessly to the computer;
    fixing a light-scope on a body member on the remote control, wherein the light-scope includes a lens system having at least one lens and defining a narrow field of view;
    pointing the light-scope at an aiming point on the screen of the television such that the light-scope receives a light signal emitted from the aiming point;
    detecting a light signal received by the light-scope with a photo detector; and
    sending back to the remote control receiver a communicating IR signal communicating the timing that the light signal is emitted from the aiming point on the screen of the television as pointed by the light-scope, whereby the computer can display a cursor at the aiming point.

36. The method of claim 35 wherein the step of sending back includes driving an IR emitter with an electric signal that is converted from the light signal detected by the photo detector.

37. The method of claim 35 wherein the communicating IR signal is an IR pulse, and the IR pulse is emitted essentially at the same time that the light signal is emitted from the aiming point.

38. The method of claim 35 wherein the communicating IR signal is an IR pulse, and the IR pulse is emitted with a predetermined delay relative to the time that the light signal is emitted from the aiming point.

39. The method of claim 35 wherein the communicating IR signal is a coded communicating signal.

* * * * *